United States Patent
Robitzsch

(10) Patent No.: US 12,309,060 B2
(45) Date of Patent: May 20, 2025

(54) METHODS, APPARATUS, AND SYSTEMS FOR ISOLATION OF SERVICE CHAINS IN A NAME-BASED ROUTING SYSTEM

(71) Applicant: InterDigital Patent Holdings, Inc., Wilmington, DE (US)

(72) Inventor: Sebastian Robitzsch, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/265,371

(22) PCT Filed: Dec. 10, 2021

(86) PCT No.: PCT/US2021/062906
§ 371 (c)(1),
(2) Date: Jun. 5, 2023

(87) PCT Pub. No.: WO2022/125958
PCT Pub. Date: Jun. 16, 2022

(65) Prior Publication Data
US 2024/0080265 A1    Mar. 7, 2024

Related U.S. Application Data

(60) Provisional application No. 63/123,662, filed on Dec. 10, 2020.

(51) Int. Cl.
*H04L 45/302* (2022.01)
*H04L 45/74* (2022.01)
*H04L 67/63* (2022.01)

(52) U.S. Cl.
CPC ............ *H04L 45/306* (2013.01); *H04L 45/74* (2013.01); *H04L 67/63* (2022.05)

(58) Field of Classification Search
CPC ........ H04L 45/306; H04L 45/74; H04L 67/63
(Continued)

(56) References Cited

U.S. PATENT DOCUMENTS

| 10,122,632 B2 | 11/2018 | Trossen et al. |
| 2013/0336132 A1* | 12/2013 | Shaw ................ H04L 41/5003 370/252 |

(Continued)

FOREIGN PATENT DOCUMENTS

| WO | WO 2018/112212 A1 | 6/2018 |
| WO | WO 2019/140385 A1 | 7/2019 |

OTHER PUBLICATIONS

Brown Ruth et al., "Dynamic End-to-End Slicing for 5G Verticals", IEEE 31$^{st}$ Annual International Symposium on Personal, Indoor and Mobile Radio Communications: Track 2: Networking and MAC, Aug. 2020, 7 pages.

(Continued)

*Primary Examiner* — Wing F Chan
*Assistant Examiner* — Leon Y Tseng
(74) *Attorney, Agent, or Firm* — Mark D. Pratt

(57) ABSTRACT

Methods, apparatus, systems, architectures, and interfaces for a path computation element (PCE) performing run-time operations for providing isolated service chains in a name-based routing system of communications network, are provided. A method may include any of: receiving, from a client device, a first message requesting a forwarding identifier (FID) associated with a fully qualified domain name (FQDN) of a service function (SF), the first message including information indicating: (1) a first identifier (ID) associated with the FQDN of the SF, and (2) a second ID associated with the FQDN of the SF; on condition that the PCE has determined that the first ID is for a subscriber associated with a namespace known to the PCE, determining (Continued)

the FID associated with the FQDN of the SF according to namespace information; and transmitting information associated with the FID to the client device.

20 Claims, 11 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2016/0099853 A1* | 4/2016 | Nedeltchev | ......... H04L 43/0888 |
| | | | 370/253 |
| 2017/0237656 A1* | 8/2017 | Gage | ................... H04L 61/2521 |
| | | | 370/392 |
| 2018/0007116 A1 | 1/2018 | Trossen | |
| 2019/0327169 A1 | 10/2019 | Alam et al. | |
| 2021/0176613 A1* | 6/2021 | Purkayastha | ........... H04W 4/02 |
| 2021/0392562 A1* | 12/2021 | Thorat | .................... H04L 45/72 |
| 2023/0037031 A1* | 2/2023 | Wang | ...................... H04W 8/08 |

OTHER PUBLICATIONS

D. Trossen, et al., "Internet Services over ICN in 5G LAN Environments", Internet Draft, Oct. 2020, 27 Pages.

D. Trossen, et al., "D3.10: Flame Platform Architecture and Infrastructure Specification V2" Flame, 2018.

Robitzsch et al., "FUDGE-5G Platform Architecture Components and Interface", FUlly DisinteGrated private nEtworks for 5G verticals (FUDGE), Deliverable 1.2, Version 1.0, Work Package 1, Aug. 2021, 77 pages, Aug. 31, 2021.

\* cited by examiner

METHODS, APPARATUS, AND SYSTEMS FOR ISOLATION OF SERVICE CHAINS IN A NAME-BASED ROUTING SYSTEM

CROSS-REFERENCE TO RELATED APPLICATIONS

This application is the 371 National Stage of International Application No. PCT/US2021/062906, filed Dec. 10, 2021, which claims the benefit of U.S. Provisional Application No. 63/123,662, filed Dec. 10, 2020, the entire contents of which are incorporated herein by reference.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as 5G, and/or other similar wireless communication systems and technology may include features and/or technologies for any of Name-based Routing (NbR) approach based on Information Centric Networking (ICN) principles, the ability to register IP service endpoint (servers) and the current mapping to 3GPP.

BRIEF DESCRIPTION OF THE DRAWINGS

A more detailed understanding may be had from the following description, given byway of example in conjunction with the accompanying drawings, wherein like reference numerals in the figures indicate like elements, and wherein.

EXAMPLE NETWORKS FOR IMPLEMENTATION OF THE EMBODIMENTS

Figure 1A:
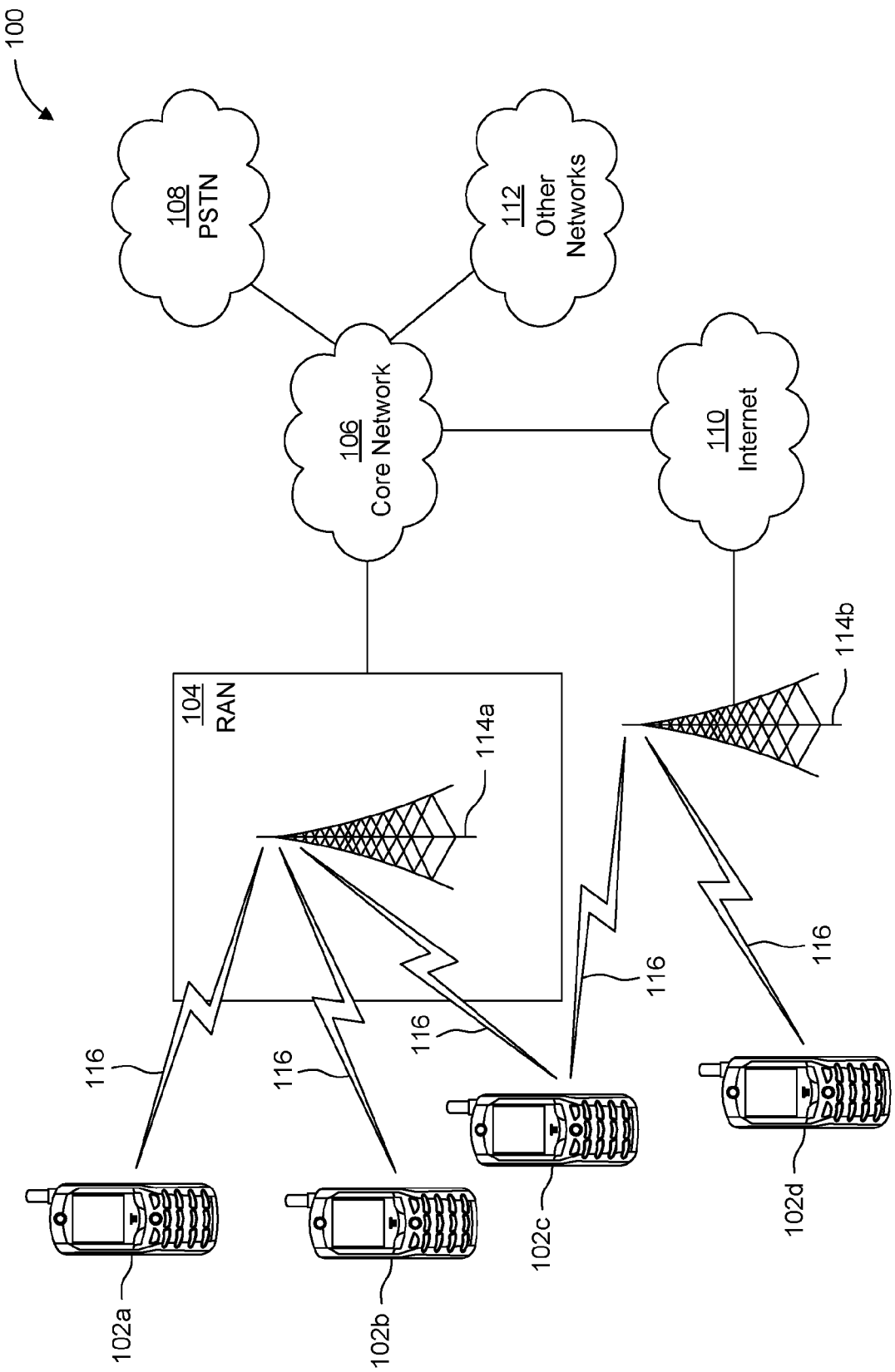
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
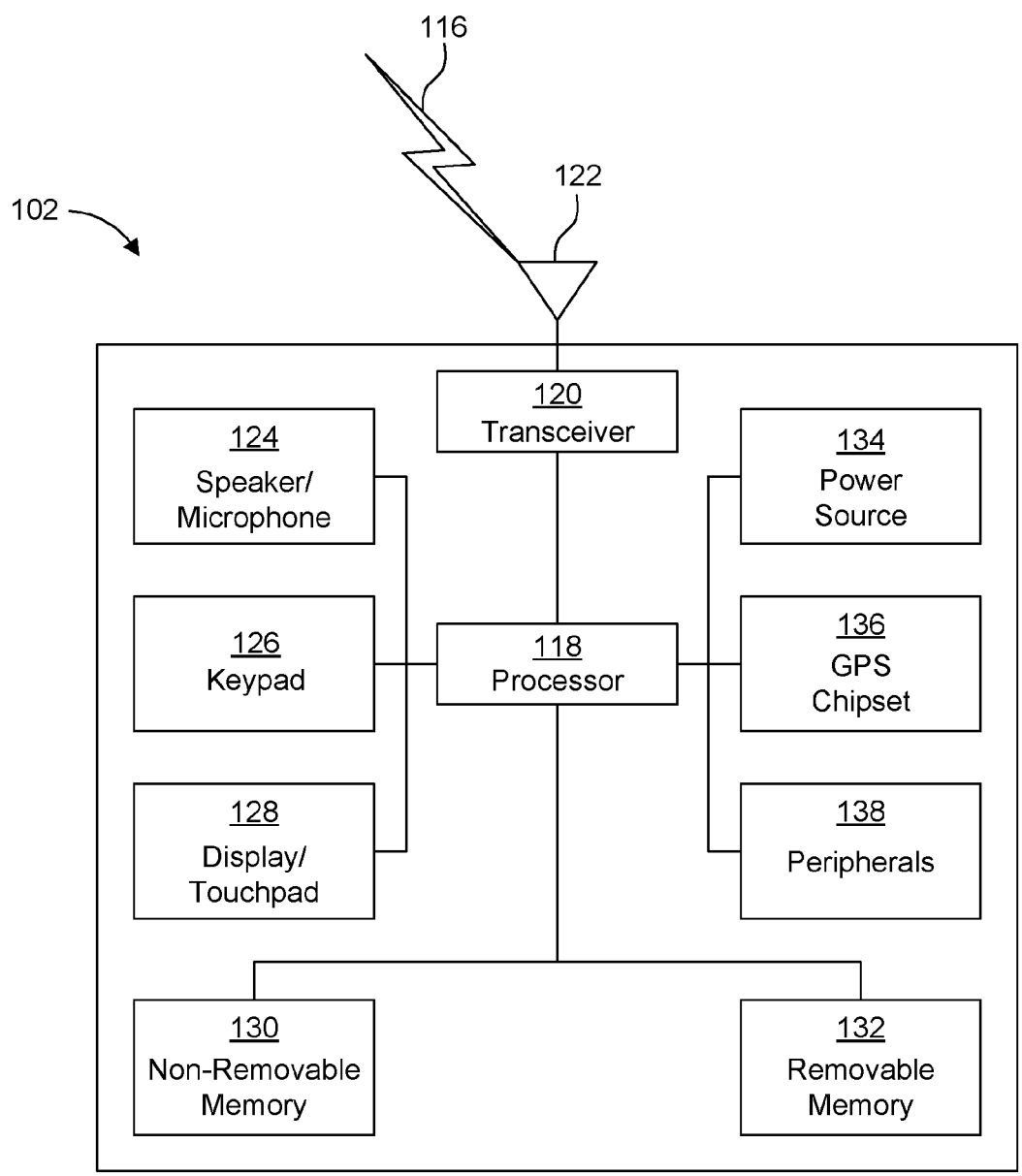
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
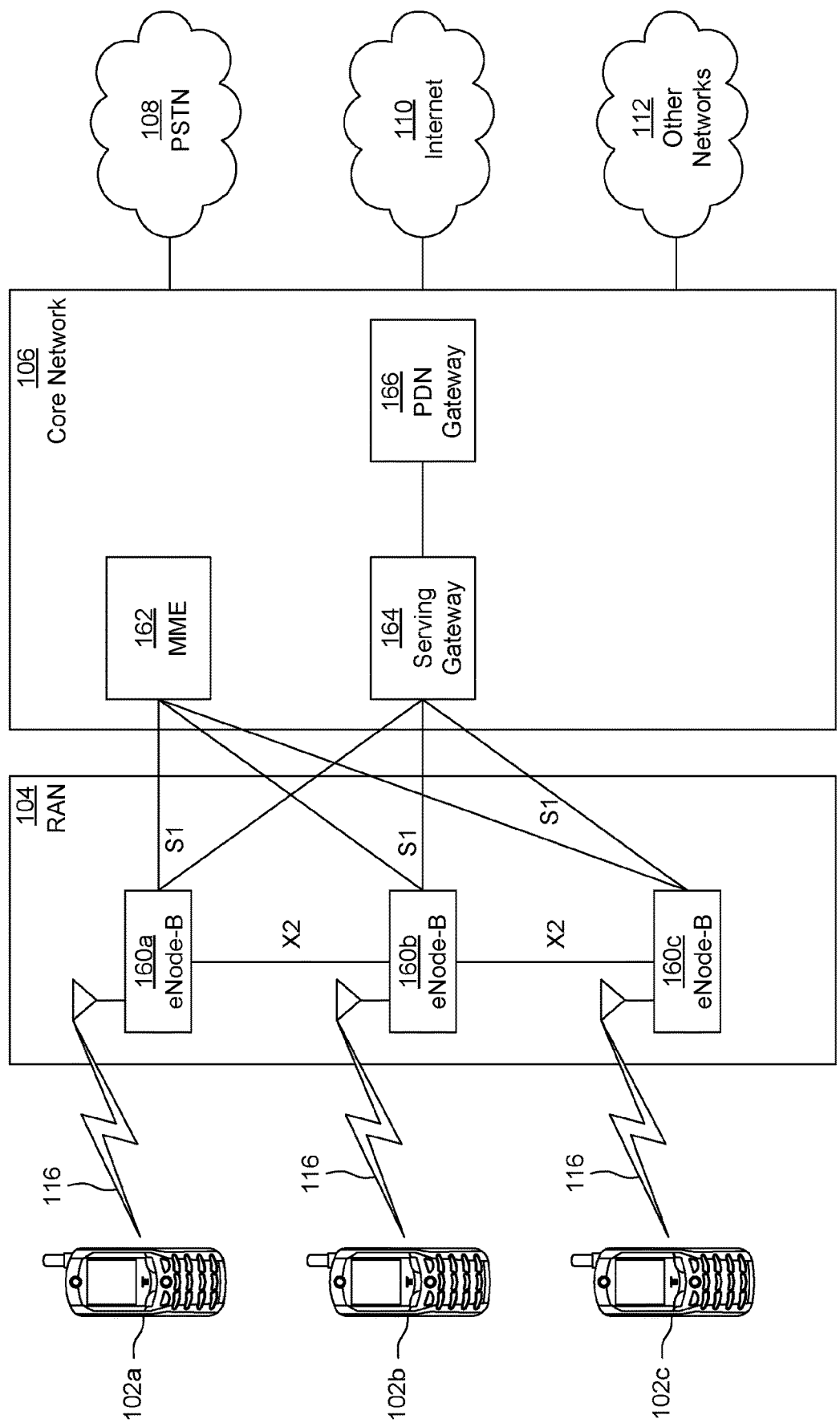
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily, or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11 ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
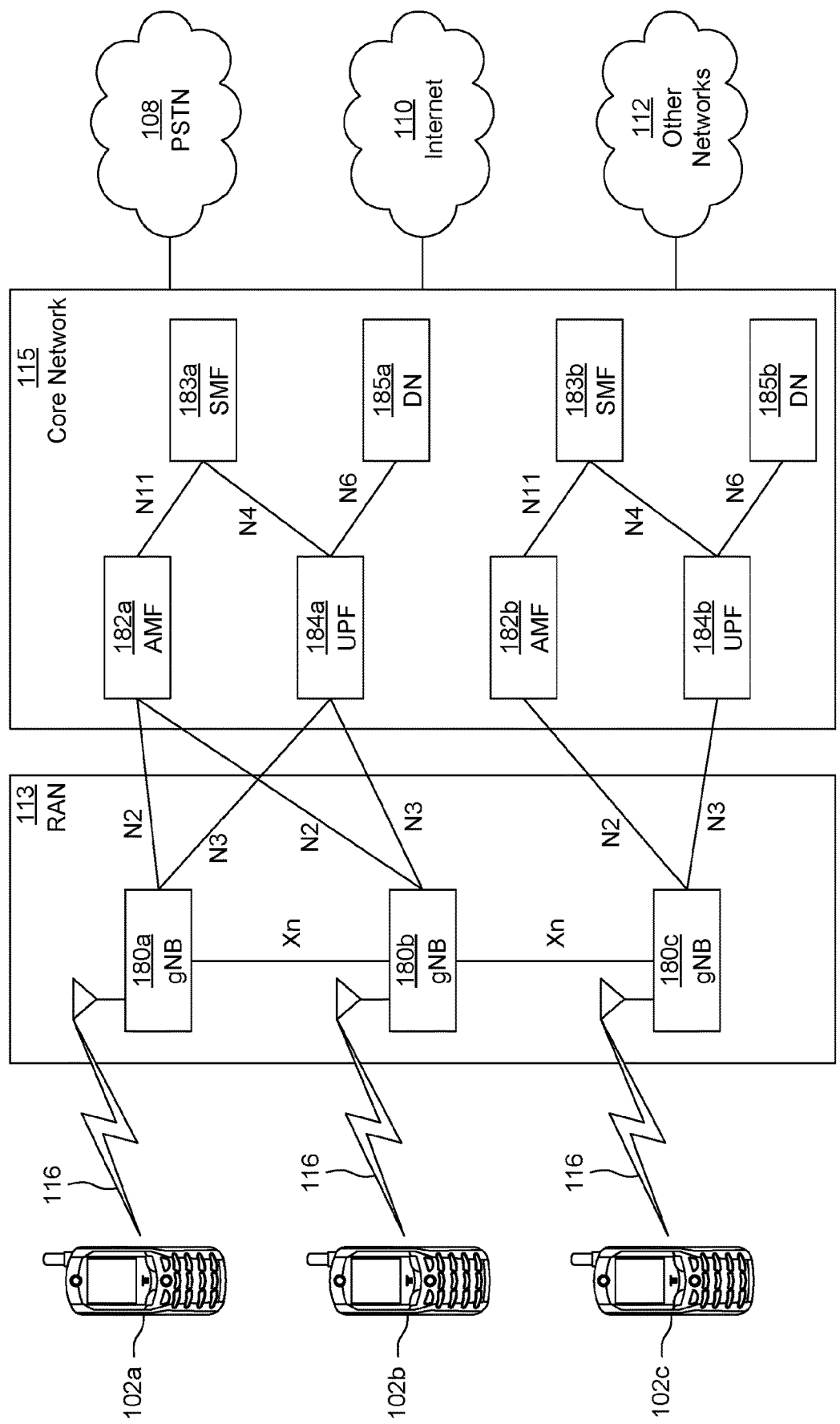
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-d, Base Station 114*a*-b, eNode-B 160*a*-c, MME 162, SGW 164, PGW 166, gNB 180*a*-c, AMF 182*a*-b, UPF 184*a*-b, SMF 183*a*-b, DN 185*a*-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Isolation in Transport Networks

Isolation may be considered as an aspect or objective of slicing (e.g., network slicing) of a (e.g., communication) system, and isolation may include (e.g., entail) isolation (e.g., separation) of the communication between two (e.g., network) entities and the QoS enforcement of the isolated communication. In conventional (e.g., state of the art) transport networks that include (e.g., have) slicing, isolation may include use of technologies such as MPLS or VLAN, wherein each packet receives an additional layer below the IP routing (layer 3) layer, which allows for identification of a communication as belonging to a particular endpoint. For example, in the case of virtualized environments, a VLAN may be (e.g., is often) used to separate the communication, thus enforcing an isolation of communication and the QoS enforcement of such isolated communication. However, in the case of multiprotocol label switching (MPLS) or virtual local area network (VLAN), there is a need for each switch in a communication path to determine a port (e.g., decide on which network interface controller (NIC) port) an packet should be forwarded to, for example, based on the MPLS label or VLAN tag. Furthermore, in Infrastructure-as-a-Service (IaaS) environments where endpoints are virtualized (e.g. OpenStack, Azure, AWS), the tagging of packets for isolation purposes is done entirely within the infrastructure, requires support from infrastructure components for run-time creation of switching states, and allows only a fixed number of tags to be created at deployment time.

Name-Based Routing

An aspect (e.g., an objective) of Name-base Routing (NbR) is providing (e.g., the ability to offer) transparent service routing for HTTP services, for example, while preserving (e.g., aspects of, the nature of, the structure of, etc.) the communication stack of endpoints (e.g., an Internet Protocol (IP)-based node). In this regard, NbR uses ICN concepts and features, such as publish/subscribe (pub/sub) concepts and features, for decoupling the information space of who has the information from the underlying routing. For example, NbR seamlessly integrates with an SDN-based switching fabric that: (1) supports at least OpenFlow 1.3 (and/or above 1.3); and (2) is composed of: (a) Service Proxies (SPs) at each side of the client-server communication translating the IP world into ICN and vice versa, and (b) a Path Computation Element (PCE) performing the matching of publishers to subscribers and the calculation of the path through the network.

Figure 2:
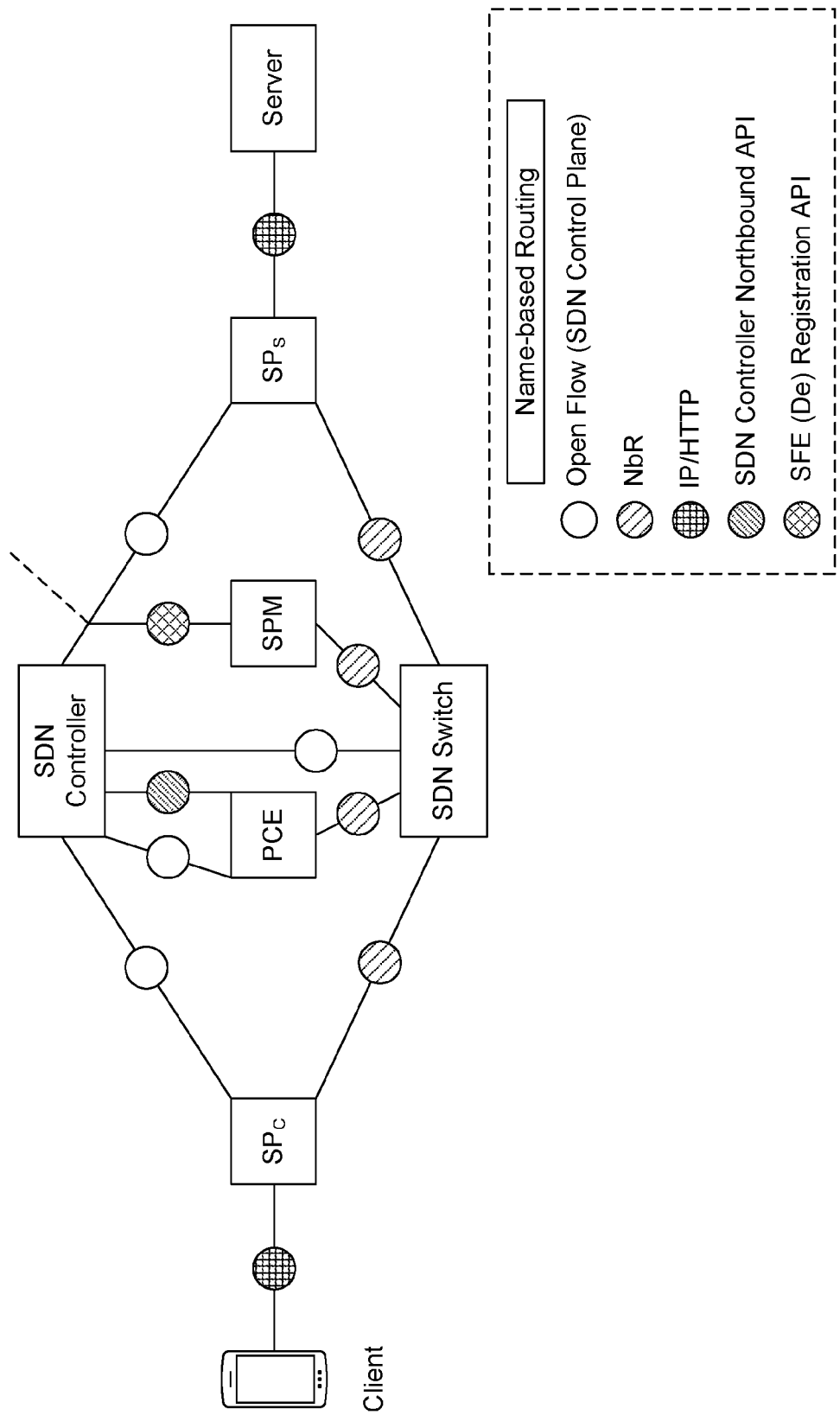
FIG. 2 is a diagram illustrating a name-based routing system architecture, according to embodiments.

FIG. 2 is a diagram illustrating a name-based routing system architecture, according to embodiments.

For example, embodiments discussed hereinbelow may implemented according to (e.g., in, on, using, through, via, across, utilizing, etc.). According to embodiments, a name-based routing (NbR) system (e.g., a system architecture of/for NbR) may include (e.g., comprise, be composed of, have, consist of, etc.) any number of NbR components: a SPc, e.g., the SP serving the client; a SPs, the SP serving the server; and the PCE. Further, the NbR system may include a SDN switching fabric and interfaces, which are shown in FIG. 2.

In a conventional case (e.g., according to the state of the art), NbR includes two ICN-specific abstractions for specific (e.g., types of) internet traffic, for example, an abstraction for HTTP-based traffic and an abstraction for any other IP-based traffic. For example, according to a conventional case of HTTP traffic using Transport Layer Security (TLS) for encrypting transactions (e.g., traffic), NbR (e.g. provides, offers, etc.) supports TLS. In such conventional cases (e.g., in all such scenarios) the SPs act as transparent proxies, and no explicit addressing of SPs is used (e.g., needed, required, etc.) for IP endpoints, and in such conventional cases, SPs are placed anywhere along the communication path between a client and a server.

According to embodiments (e.g., as discussed hereinbelow), there may be a (e.g., new, further, additional, non-conventional, etc.) NbR component referred to as a Service Proxy Manager (SPM), for example, included in and/or introduced in a system architecture for NbR, such as that illustrated in FIG. 2. According to embodiments, a SPM may (e.g., be essentially responsible to) provide a service endpoint for registering and/or deregistering IP serving endpoints (e.g., IP servers). Procedures for an SPM (e.g., an interface of or associated with the SPM) (e.g., as discussed elsewhere, for example in WO Pub. No. 2018/112212 A1, which is incorporated by reference herein), may include, in a case of arrival of a request, the SPM distributing information regarding a (e.g., which) SP is serving a (e.g., which) FQDN, for example, including the IP address of the endpoints. In such a case, the SP may (e.g., then) perform publish/subscribe operations (e.g., as discussed elsewhere, such as US Patent Application Pub. No. 2018/0007116, which is incorporated by reference herein). For example, the SP serving the new IP service endpoint (e.g., server) issues a subscription to the content identifier/http/FQDN towards the PCE, which allows the PCE to have a list of subscribers (SPs) to FQDNs to choose from, for example, when a client sends a HTTP request to the registered FQDN. Further, in such a case, a PCE may (e.g., then) implement various policies to choose from, for example, to decide which SP to select.

Service Orchestration Over NbR

In a case of (e.g., referring to) the Horizon 2020 project FLAME, there is a cloud native orchestration layer implemented and trialed (e.g., tested) in more than 20 occurrences across three European cities. Such implementation of an orchestration layer is for (e.g., directed to, aimed at, etc.) a telco (e.g., telecommunication service provider, communication network operator, data network service, wireless network provider, etc.) cloud developed based on an information model using Service Function Chaining (SFC) terminology and has adopted such an information model.

Such information model includes (e.g., encompasses) any of the following terminology, elements, and scopes: (1) a Service Chain (SC): a set of service functions implementing any of a service and an application; (2) a Service Function (SF): a packaged image implementing parts of the service in a cloud native fashion (e.g., as a micro service); and (3) a Service Function Endpoint (SFE): an instance of an orchestrated SF. In a case of a service chain being orchestrated (e.g., deployed), the orchestrator (e.g., eventually) uses the FQDN registration interface of the NbR layer to register new SFEs, for example, after (in a case of performing, following, upon, etc.) other registration procedures (e.g., as discussed elsewhere, for example in US Pat. No.: U.S. Ser. No. 10/122,632, which is incorporated by reference herein).

Mapping to 3GPP

In a case of (e.g., referring to) 3GPP Service and System Aspects Working Group 2 (SA2), a dedicated component, a Service Communication Proxy (SCP), for service routing purposes is defined in Release 15 (Rel. 15). For example, In Technical Specification (TS) 23.501, NbR is listed as one of three deployment options for an SCP. In order to foster a cloud native orchestration and lifecycle management of a 5G Core (5GC), as aimed for in the Horizon 2020 project FUDGE-5G (F5G), NbR's SFE registration interface may be used by a 5GC orchestrator to register orchestrated 5GC NF instances.

In a case of slicing (e.g., network slicing, as noted above), significant aspects (e.g., focuses, goals, etc.) of end-to-end communication include resource sharing (e.g., using any of an opportunistic or an explicit manner) and isolation of slices (e.g., network slices) from each other. In a case of conventional NbR, there may not be support the isolation of service chains, for example, to make sure that one service chain cannot communicate with another service chain. Such a case of conventional NbR is a consequence of the design of the (e.g., conventional) internet, wherein services are publicly available. However, in as case of a 3GPP control plane, such publicly available services may not be available (e.g., are not desired, are not used, are excluded, etc.), because, for example, different 5GCs may not (e.g., should not, must not, need not, etc.) be able to communicate with each other, for example, for any number of reasons.

According to embodiments (e.g., in view of the above discussed shortcomings and limitations of conventional NbR), there may be (e.g., there is a need for, requirement for, necessity for, etc.) features (e.g., operations, procedures, methods, aspects, characteristics, etc.) of a SFE registration interface allowing orchestrators to define whether service chain isolation is required at registration time, and features of internal semantics for NbR publish/subscribe operations/features, for example, to ensure no that no malicious and/or unintended communication is included in (e.g., is being injected into) the NbR layer at a network edge, where it may occur.

According to embodiments, in a case of isolating service chains (e.g., in order to allow for the isolation of service chains), there may be any of the following features: (1) communicating (e.g., providing, sending, allowing access of, etc.) service chain properties to a routing layer (e.g., operations, features, entities, services, etc., associated with routing), for example, at orchestration time; and (2) run-time procedures inside (e.g., of, associated with, etc.) the routing layer for service proxies serving endpoints and service endpoints.

Orchestration of a Service Chain

According to embodiments, in a case of orchestrating (e.g., generating, composing, providing, constructing, instantiating, etc.) a service chain, or in other words, at orchestration time of a service chain (e.g., following the concepts of, and/or similar to, service function chaining (SFC)), a resource descriptor may be communicated to a service chain controller, which defines the service functions and their properties. According to embodiments, such properties (e.g., of service functions and/or SFCs), may include any of: a FQDN associated with the service functions, for example, the FQDN at which service functions are (e.g., supposed to be) reachable; a number of CPUs; an amount of memory; and/or similar properties associated with a service. According to embodiments, in a case of orchestrating a service chain (e.g., once/upon/if the service chain is being orchestrated), a service chain controller may communicate (e.g., indicate, signal, etc.), for example, to the routing layer, which service function endpoint is serving which FQDN, wherein the service function endpoint may be identified using a (e.g., unique) identifier, such as, for example, its MAC or IP address. According to embodiments, such steps and/or procedures for registration of service function endpoints may be discussed elsewhere (for example in WO Pub. No. 2018/112212 A1, which is incorporated herein by reference).

Figure 3:
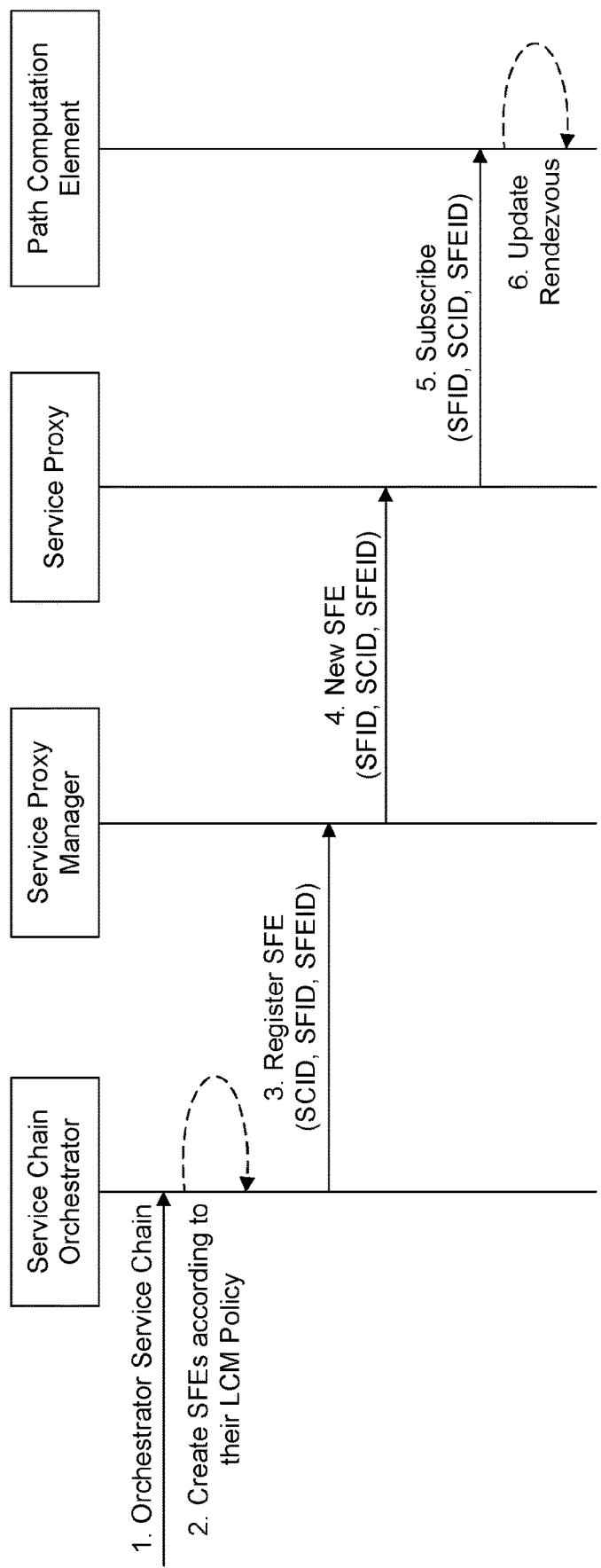
FIG. 3 is a diagram illustrating a message sequence for orchestrating a service chain, according to embodiments.

FIG. 3 is a diagram illustrating a message sequence for orchestrating a service chain, according to embodiments.

According to embodiments, for example, referring to FIG. 3, there may be a message sequence chart for the orchestration and registration of an SFE against the routing layer, including any of the below discussed operations. According to embodiments, as a first operation, a Service Chain Orchestrator (SCO) may receive an orchestration request including information indicating a descriptor containing the service chain and its requested resources. According to embodiments, the SCO may perform validation and interpretation tasks, for example, ensuring the validity of the indicated descriptor. According to embodiments, part of a (e.g., indicated) descriptor may be a Boolean field, for example, defining any of whether isolation is requested, or if an entire service chain may be reached by/at any endpoint. According to embodiments, such a Boolean field, which may be referred to an isolation toggle, may be set per service chain and/or per service function, for example, (only) if desired. According to embodiments, as a second operation, a SCO may (e.g., then) deploy SFEs, for example, according to (e.g., respective) lifecycle management (LCM) policies.

According to embodiments, as a third operation, in a case of (e.g., upon, after, if, etc.) successful orchestration of all SFEs, a SCO may register such SFEs against the routing layer, for example, by communicating information associated with (e.g., indicating) any of: a Service Chain Identifier (SCID), a Service Function Identifier (SFID), and Service Function Endpoint Identifier (SFEID), to the SPM. According to embodiments, such information may be communicated (e.g., indicated) for each orchestrated SFE that may be (e.g., which is supposed to be) exposed to the routing layer (e.g., as discussed elsewhere, for example in WO Pub. No. 2018/112212 A1). According to embodiments, as (e.g., because, in a case where, when, upon, etc.) isolation is requested by the orchestrator, the SFE registration may also include an SCID associated with (e.g., which is) the parent domain under which all SFs of the service chain have received unique sub domains. In such a case, according to embodiments, an SFID may be associated with (e.g., is) the actual FQDN for an SF, and an SFEID may be a unique communication identifier, such as, for example, a MAC or an IP address. According to embodiments, in a case where a service chain is composed of two SFs, for example, with $SF_1$'s SFID set to sf1.foo.com and $SF_2$'s SFID set to sf2.foo.com, the SCID may be foo.com. According to embodiments, an example of a json-encoded registration for $SF_2$ is provided a code block below:

```
{
  "sfid": "sf2.foo.com",
  "sfeid": "00:0c:29:14:e4:5b",
  "isolate": true,
  "scid": "foo.com"
}
```

According to embodiments, as a fourth operation, a SPM may communicate, to all SPs, information indicating a list of SFEs that the SPs may be (e.g., now) serving, such information including the information associated with (e.g., indicating, about, etc.) any of a SCID, a SFID, and a SFEID. According to embodiments, as a fifth operation (e.g., as a result of the fourth operation), each SP may issue the necessary subscriptions towards the PCE for the HTTP Content Identifier (CID)/http/<SFID>, with <SFID> being the SFID provided in the orchestration template (e.g., a FQDN). According to embodiments, in addition to the SFID, the SCID and SFEID may also communicated to the PCE, for example, as part of a subscription request. According to embodiments, as a sixth operation (e.g., after a namespace is created by the PCE, for example, as discussed elsewhere), a PCE may add a subscription under a root scope/http, with the information item SFID (FQDN) resulting in/http/<SFID>. According to embodiments, in addition to the HTTP namespace, the PCE may create a second namespace linked with the a (e.g., just/newly created) CID/http/<SFID> of format/isolation/<SCID>/<SFEID>, for example, as illustrated FIG. 4.

According to embodiments, a namespace, for example, as referred to herein, may refer to, indicate, identify, label, define, etc., any type of information (e.g., a group/collection of information, a database, one or more registers, pointers, binary data, etc.) that includes and/or is associated with: (1) identifiers and/or indicators for any of services, service chains, SCIDs, SFs, SFIDs, SFEs, SFEIDs, client IDs, WTRU IDs, device IDs, server IDs, slice IDs, network IDs, etc.; and (2) any of a mapping, a correspondence, an association, a linkage, a pairing, a pointer, a tabulation, etc., between any of the identifiers and/or indicators. According to embodiments, such information, for example, as referred to herein, may be also referred to as namespace information.

Figure 4:
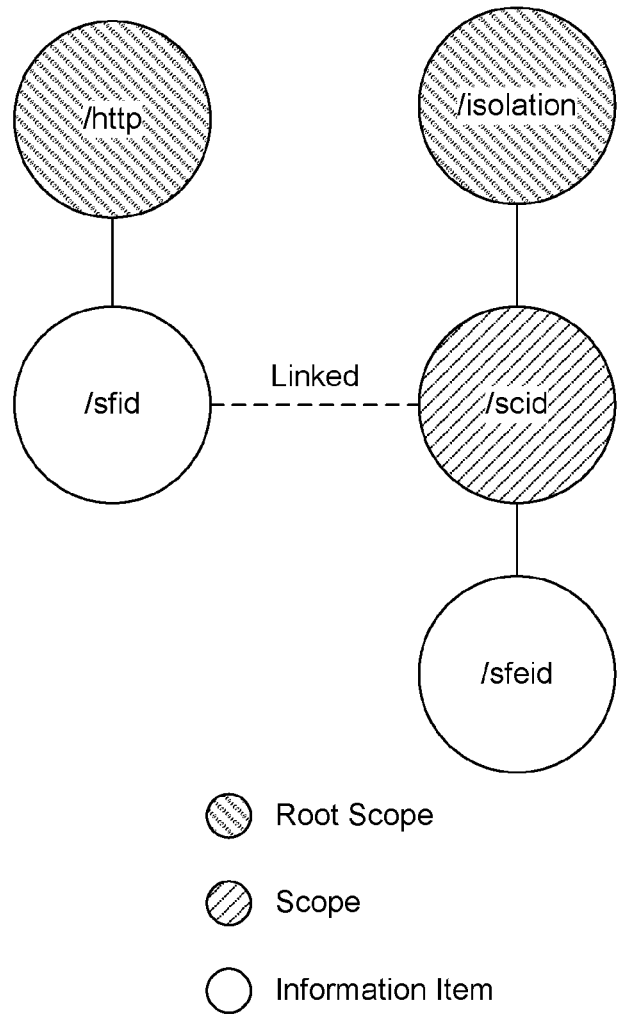
FIG. 4 is a diagram illustrating a linking of HTTP and SCID namespaces inside a PCE, according to embodiments.

FIG. 4 is a diagram illustrating a linking of HTTP and SCID namespaces inside a PCE, according to embodiments.

According to embodiments, an HTTP namespace may be linked with an isolation namespace, having a format of /isolation/<SCID>/<SFEID>, as shown in FIG. 4. According to embodiments, such linked namespace (i.e., the namespace /isolation) may be provided by a rendezvous functionality of the PCE. According to embodiments, a feature of the (e.g., newly introduced) namespace /isolation inside the rendezvous functionality of the PCE is its logically linked relationship of the information item <SFID> in CID /http/<SFID> with the scope identifier <SCID> in /isolation/<SCID>. That is, for example, as shown in FIG. 4, according to embodiments, a PCE may have (e.g., a PCE may generate, receive, determine, make, store, provide, etc.) a logically linked relationship (e.g., association, mapping, etc.) for (e.g., between) the information item in /http/<SFID> and the scope identifier /isolation/<SCID>. According to embodiments, usage of the linked namespaces may be for (e.g., may come into play at) run time operations, for example, as described below.

Run-Time Procedures in NbR

Figure 5:
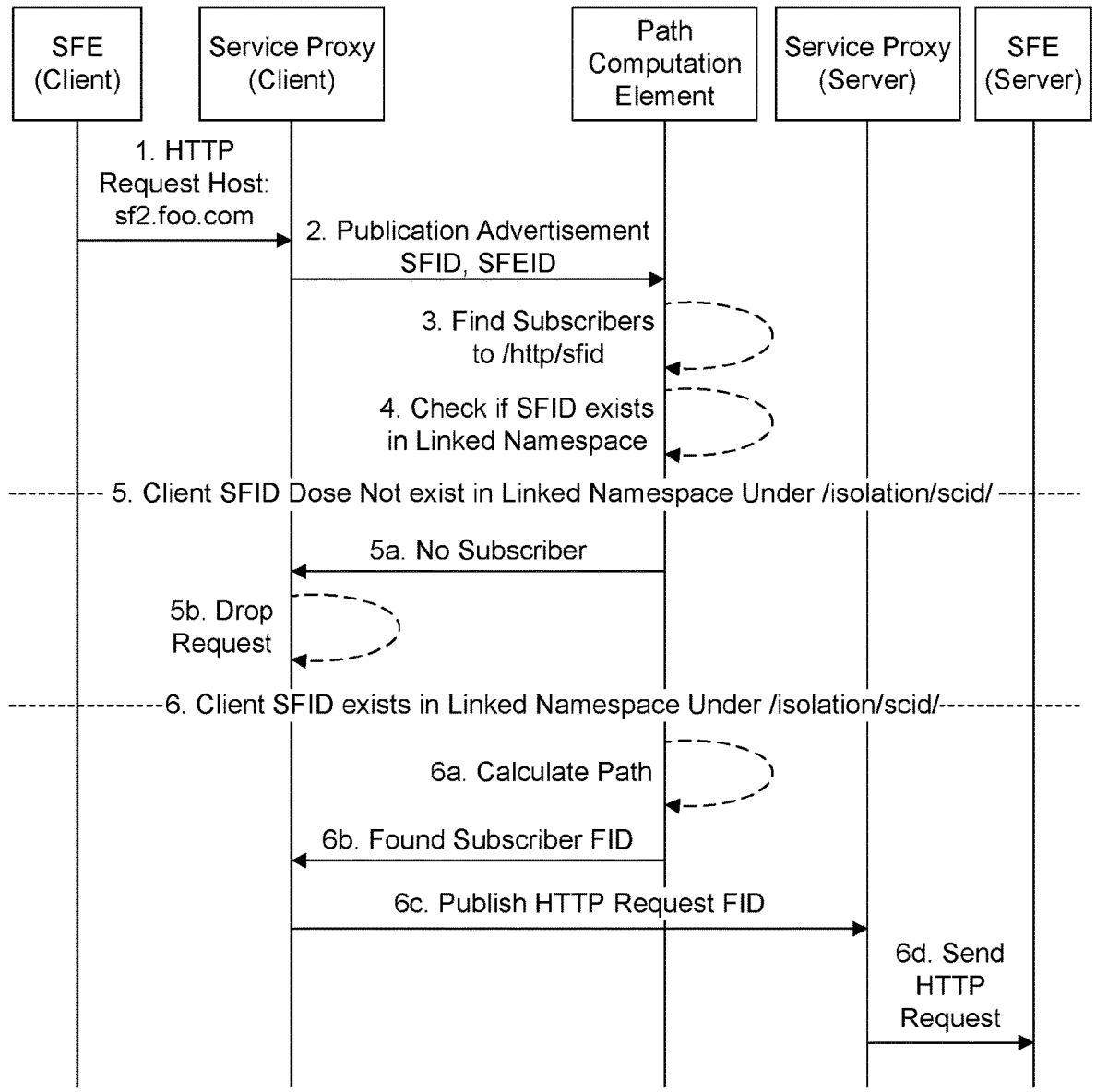
FIG. 5 is a diagram illustrating a message sequence for run time operations, according to embodiments.

FIG. 5 is a diagram illustrating a message sequence for run time operations, according to embodiments.

According to embodiments, referring to FIG. 5, there may be operations (e.g., steps, methods, features, procedures, etc.) for a SFE (e.g., a client) to communicate with another SFE (e.g., a server) over an NbR system, for example, using the stateless protocol HTTP. According to embodiments, the semantics discussed and/or described herein may apply to all HTTP versions and may be independent from/of an underlying transport protocol. According to embodiments, a SFE client may (e.g., also) be (e.g., represented by) a WTRU (e.g., a wireless node, a network node, etc.) in a 3GPP system, for example, in a case where the N1 interface is (e.g., becomes) a Service-Based Interface (SBI) allowing the WTRU to communicate, via HTTP, with a 5GC.

According to embodiments, for example, referring to FIG. 5, a single client and server may have respective (e.g., their own) SPs that may be translating the IP world into ICN and vice versa. According to embodiments, (e.g., for the sake of simplicity) a dedicated switching fabric is not explicitly shown in FIG. 5, and both SPs may communicate directly with each other. According to embodiments, for example, in the case of FIG. 5, a server SFE (SFEs) may be orchestrated, as discussed above, and may be registered under the SFID sf2.foo.com with the SCID foo.com. According to embodiments, any of the following operations may be run time operations, for example, as shown in FIG. 5.

According to embodiments, as a first operation, a client SFEc may send a HTTP request to sf2.foo.com, and the HTTP request may be received by a SPc, which is the SP serving SFEc. According to embodiments, as a second operation, a SPc may ask (e.g., request) the PCE for an FID to the subscriber where the request is supposed to be sent to. According to embodiments, the SPc may ask/request such using (e.g., via, by issuing/sending, etc.) a publication advisement including information indicating the SFID sf2.foo.com and the SFEID of SFEc (e.g., a MAC address, or IP address). According to embodiments, as a third operation, a PCE may (e.g., first) check (e.g., ascertain, determine, review, etc.) the HTTP namespace for potential subscribers.

According to embodiments, in a case of no subscriber(s) to the CID /http/sf2.foo.com, the PCE may (e.g., immediately) communicate such (e.g., that there are no subscribers) to the SPc, and the SPc may drop (e.g., ignore, stop processing, etc.) the HTTP request. Referring to FIG. 5, for simplification purposes, such is not explicitly shown. According to embodiments, as a fourth operation, in a case where a PCE has found the communicated SFID in the HTTP namespace, the PCE may (e.g., now) check (e.g., determine) if the SFEID is available in the linked isolation namespace, which points to /isolation/foo.com.

According to embodiments, a fifth operation may be a case where a PCE does not find the SFEID of the client hosting the requesting SFE in a linked isolation namespace. According to embodiments, in the case of the fifth operation, and the PCE cannot find the SFEID in the isolation namespace, the PCE may (e.g., therefore) not allow the client SFE to reach the SFE server. In such a case, the PCE may inform the client SP SPc that no subscriber is available. According to embodiments, in the case of the fifth operation, the client SP SPc may drop the HTTP request and may end the HTTP transaction (e.g., may close a TCP socket or a UDP socket).

According to embodiments, a sixth operation may be a case where a PCE finds (e.g., does find) the SFEID in the linked isolation namespace (e.g., in contrast to the case of the sixth operation). According to embodiments, in the case of the sixth operation, a PCE may compute the path from SPc to SPs, for example, because of (e.g., resulting from) finding the SFEID of the client SFE under/isolation/foo.com/. According to embodiments, in the case of the sixth operation, a PCE may communicate (e.g., provide information indicating) the path, for example, as (e.g., in a form of) a forwarding identifier (FID), to the client SP. According to embodiments, in the case of the sixth operation, the client SP may publish the HTTP request to the server SP; and the server SP may send the HTTP request to the server SFE.

Figure 6:
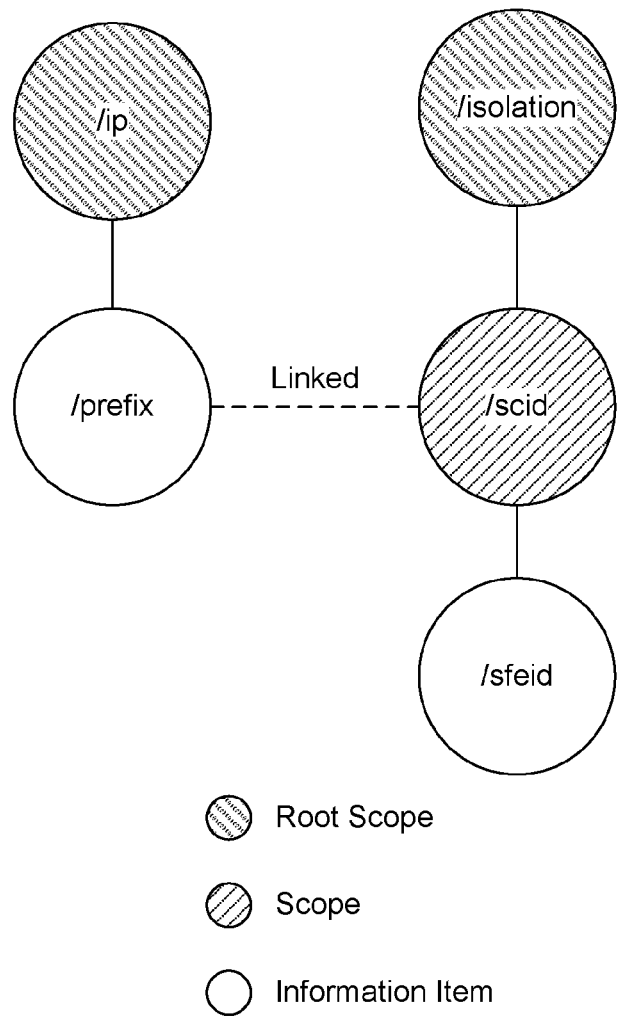
FIG. 6 is a diagram illustrating a linking of IP and SCID namespaces inside a PCE, according to embodiments.

FIG. 6 is a diagram illustrating a linking of IP and SCID namespaces inside a PCE, according to embodiments.

According to embodiments, there may be linked IP and SCID namespaces (e.g., stored, mapped, referenced, etc.) inside a PCE. According to embodiments, in a case of non-HTTP traffic, an IP namespace may be used (e.g., instead of the HTTP namespace), and a SFID may be (e.g., becomes) the IP address of the server, for example, instead of the FQDN. In such a case, according to embodiments, operations (e.g., steps, procedures, features, etc.) discussed above may not change, for example, except for the linked namespace relationship. According to embodiments, in a case of non-HTTP traffic traversing the SPs and isolation, the namespace linkage may apply (e.g., may be applied), for example, as shown in FIG. 6.

According to embodiments, aspects, features, operations, characteristics, steps, signaling, and other elements discussed above may be detected, for example, by tracing packets in a system/network (e.g., claiming to) implementing NbR with an integrated orchestration procedure. For example, there may be a case of verifying that the orchestration instructions include information associated with any of a SCID and SFIDs, which may be (e.g., then) communicated between SPs and PCE combined with the SFEID. According to embodiments, in such a case of verifying such orchestration instructions, such a system/network may implement NbR, for example, with (e.g., the possibility to offer) complete communication isolation; and such may be detected via testing (e.g., under test).

Figure 7:
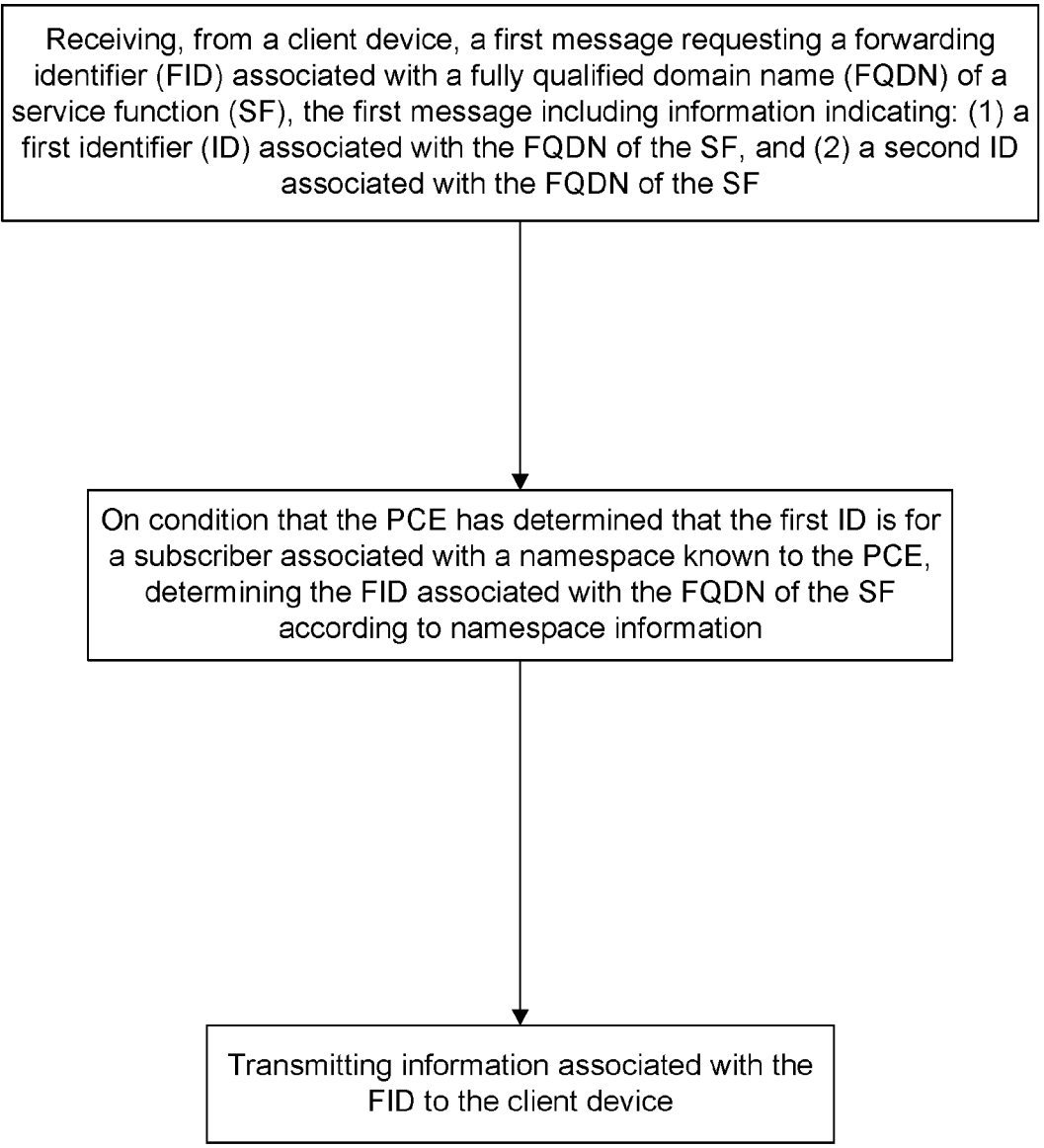
FIG. 7. is a diagram illustrating operations for a path computation element (PCE) performing run-time operations providing isolated service chains in a name-based routing system, according to embodiments.

FIG. 7. is a diagram illustrating operations for a path computation element (PCE) performing run-time operations providing isolated service chains in a name-based routing system, according to embodiments.

According to embodiments, for example, referring to FIG. 7, there may any number of operations, features, steps, computations, signal exchanges, etc., executed by a path computation element (PCE) performing run-time operations for providing isolated service chains in a name-based routing system of a communications network. According to embodiments, as a first operation, a PCE may receive, from a client device, a first message requesting a forwarding identifier (FID) associated with a fully qualified domain name (FQDN) of a service function (SF), the first message including information indicating: (1) a first identifier (ID) associated with the FQDN of the SF, and (2) a second ID associated with the FQDN of the SF. According to embodiments, as a second operation, a PCE may determine an FID associated with a FQDN of a SF according to namespace information, for example, in a case where (e.g., on condition that) the PCE has determined that the first ID is for a subscriber associated with a namespace known to the PCE.

According to embodiments, as a second operation, a PCE may transmit information associated with the FID to the client device.

According to embodiments, for example a WTRU that is a PCE referring to FIG. 7, a PCE may on condition that the PCE has determined that the first ID is not for a subscriber associated with the namespace, transmit, to the client device, information indicating that there is no subscriber. According to embodiments, a PCE may not permit or not allow information sent by the client device to be communicated to a SF endpoint (SFE). According to embodiments, a PCE may terminate an associated HTTP transaction by any of: closing any of a TCP socket or a UDP socket, and transmit information commanding the client device to drop a HTTP request associated with the first message. According to embodiments, a first ID may be a SF ID (SFID) of the SF. According to embodiments, a PCE may determine whether the first ID identifies a subscriber associated with the namespace of the FQDN.

According to embodiments, for example a WTRU that is a PCE referring to FIG. 7, a PCE may determine whether the second ID is included in a linked isolation namespace pointing to the FQDN. According to embodiments, a PCE may determine the FID according to the linked isolation namespace. According to embodiments, the second ID may be a SF Endpoint (SFE) ID (SFEID) for a SFE associated with the FQDN of the SF. According to embodiments, a PCE may perform any of the following: (1) compute the path from the client device towards the SFE; and (2) transmit, to the client device, the path as a forwarding identifier (FID), for example, on condition that the PCE finds the SFEID in the linked isolation namespace. According to embodiments, the first ID may be a FQDN associated with any of: a client application, a network operator application, a service provider application, a service, a network function, and a network operation. According to embodiments, the second ID may be any of an IP address, a MAC address, a logical address, an International Mobile Subscriber ID (IMSI), a physical ID, and a hardware ID. According to embodiments, any of a configuration of the namespace or an isolation of the namespace may be based on any of a service chain ID (SCID), a SFID, and a SFEID. According to embodiments, a PCE may communicate with a service proxy that is included with the client device or that is separate from the client device. According to embodiments, a PCE may transmit the FID from the PCE directly to the service proxy, for example, in a case where the PCE is communicating with a service proxy separate from a (e.g., associated, corresponding, etc.) client device.

Figure 8:
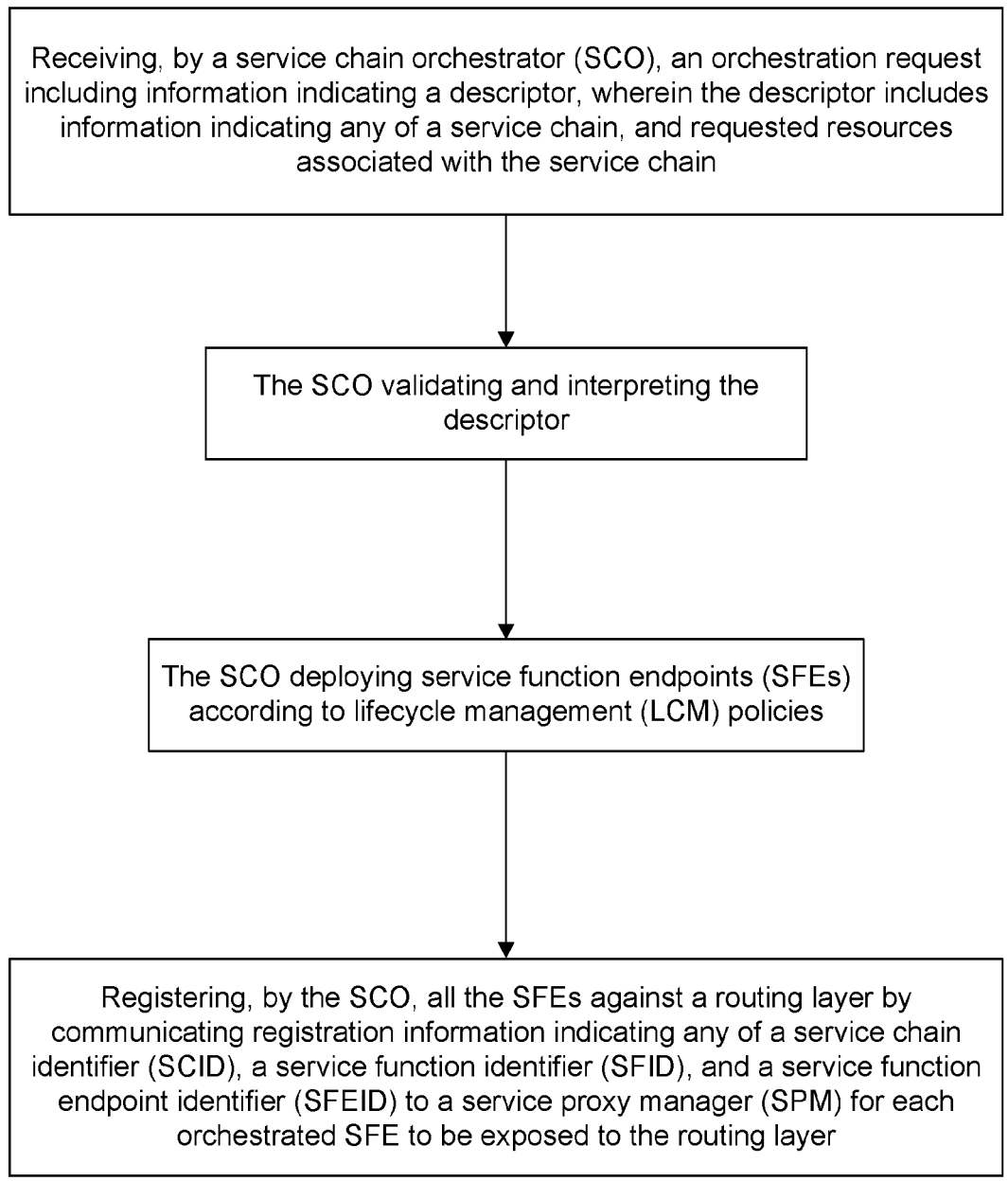
FIG. 8. is a diagram illustrating operations for providing isolation of service chains in a name-based routing system, according to embodiments.

FIG. 8. is a diagram illustrating operations for providing isolation of service chains in a name-based routing system, according to embodiments.

According to embodiments, for example, referring to FIG. 8, there may any number of operations, features, steps, computations, signal exchanges, etc., for providing isolation of service chains in a name-based routing system of a communications network. According to embodiments, a first operation may be receiving, by a service chain orchestrator (SCO), an orchestration request including information indicating a descriptor, wherein the descriptor includes information indicating any of a service chain, and requested resources associated with the service chain. According to embodiments, a second operation may be validating and interpreting, by the SCO, the descriptor. According to embodiments, a third operation may be deploying, by the SCO, any number of service function endpoints (SFEs) according to respective lifecycle management (LCM) policies. According to embodiments, a fourth operation may be registering, by the SCO, all the SFEs against a routing layer by communicating registration information indicating any of a service chain identifier (SCID), a service function identifier (SFID), and a service function endpoint identifier (SFEID) to a service proxy manager (SPM) for each orchestrated SFE to be exposed to the routing layer. For example, such fourth operation may be performed on condition of successful orchestration of all SFEs.

According to embodiments, a descriptor may be a Boolean field defining whether isolation is requested or if the entire service chain may be reached by any endpoint, and the Boolean field may be an isolation toggle set per service chain or per service function. According to embodiments, validating and interpreting a descriptor may be (e.g., performed) for ensuring validity of the descriptor. According to embodiments, registration information may include an SCID for the parent domain under which all SFs of the service chain have received unique sub domains, and a SFID may be an actual FQDN for an SF, and the SFEID may be a unique communication identifier, such as, for example, a MAC address or a IP address. According to embodiments, referring to FIG. 8, a SPM may communicate, to all SPs, information indicating a list of SFEs that the SPs are serving, the information further indicating any of a SCID, a SFID, and a SFEID. According to embodiments, referring to FIG. 8, each SP may issue subscriptions towards a path computation element (PCE) for a HTTP Content Identifier (CID) being /http/<SFID>, and the <SFID> may be the SFID provided in the orchestration template, and each SP may communicate any of the SFID, the SCID, and the SFEID, to the PCE, as part of this subscription request. According to embodiments, referring to FIG. 8, a PCE may add the subscription under the root scope /http with the information item SFID (FQDN) resulting in /http/<SFID>, and the PCE may create a second namespace that is linked with the CID /http/<SFID> of format /isolation/<SCID>/<SFEID>.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra-Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A first wireless transmit/receive unit (WTRU) comprising:
a processor, a transmitter, a receiver, and a memory configured to:
receive, from a second WTRU, a first message requesting a forwarding identifier (FID) associated with a fully qualified domain name (FQDN) of a service function (SF), the first message including a SF identifier (SFID) associated with the FQDN of the SF, and a SF endpoint identifier (SFEID) associated with the FQDN of the SF;
identify a subscriber associated with the SFID in a first namespace of subscribers;
determine whether the SFEID is available in a second namespace; and
based on the SFEID being available in the second namespace, send a second message to the second WTRU indicating the FID associated with the FQDN of the SF.

2. The first WTRU of claim 1, wherein the second namespace is a linked isolation namespace.

3. The first WTRU of claim 1, wherein the FQDN is associated with the second WTRU.

4. The first WTRU of claim 1, wherein the processor is configured to:
send a third message to the second WTRU indicating that there is no subscriber based on the SFEID not being available in the linked isolation namespace.

5. The first WTRU of claim 1, wherein the processor is further configured to receive a plurality of subscriptions that comprise respective SFIDs and SFEIDs associated with respective SFs of a plurality of SFs.

6. The first WTRU of claim 1, wherein the processor is configured to:
transmit, to the second WTRU, information indicating that there is no subscriber based on the SFID not being for a subscriber associated with the first namespace.

7. The first WTRU of claim 1, wherein, based on the processor identifying the SFEID in the second namespace, the processor is further configured to:
compute a path from the second WTRU towards a service function endpoint (SFE); and
transmit, to the second WTRU, the path as the forwarding identifier (FID).

8. The first WTRU of claim 1, wherein the SFID is associated with one or more of a client application, a network operator application, a service provider application, a service, a network function, and a network operation, and wherein the SFEID is associated with one or more of an IP address, a MAC address, a logical address, an International Mobile Subscriber ID (IMSI), a physical ID, and a hardware ID.

9. The first WTRU of claim 1, wherein one or more of a configuration of the second namespace or an isolation of the second namespace is based on one or more of a service chain ID (SCID), a SFID, or a SFEID.

10. The first WTRU of claim 1, wherein the processor is further configured to:
communicate with a service proxy that separate from the second WTRU; and
transmit, based on a path computation element communicating with the service proxy, the FID directly to the service proxy.

11. A method performed by a first wireless transmit/receive unit (WTRU), the method comprising:
receiving, from a second WTRU, a first message requesting a forwarding identifier (FID) associated with a fully qualified domain name (FQDN) of a service function (SF), the first message including a SF identifier (SFID) associated with the FQDN of the SF, and a SF endpoint identifier (SFEID) associated with the FQDN of the SF;
identifying a subscriber associated with the SFID in a first namespace of subscribers;
determining whether the SFEID is available in a second namespace; and
based on the SFEID being available in the second namespace, sending a second message to the second WTRU indicating the FID associated with the FQDN of the SF.

12. The method of claim 11, wherein the second namespace is a linked isolation namespace.

13. The method of claim 11, wherein the FQDN is associated with the second WTRU.

14. The method of claim 11, further comprising:
sending a third message to the second WTRU indicating that there is no subscriber based on the SFEID not being available in the linked isolation namespace.

15. The method of claim 11, further comprising, receiving a plurality of subscriptions that comprise respective SFIDs and SFEIDs associated with respective SFs of a plurality of SFs.

16. The method of claim 11, further comprising:
transmitting, to the second WTRU, information indicating that there is no subscriber based on the SFID not being for a subscriber associated with the first namespace.

17. The method of claim 11, further comprising, based on identifying the SFEID in the second namespace:
computing a path from the second WTRU towards a service function endpoint (SFE); and
transmitting, to the second WTRU, the path as the forwarding identifier (FID).

18. The method of claim 11, wherein the SFID is associated with one or more of a client application, a network operator application, a service provider application, a service, a network function, and a network operation, and wherein the SFEID is associated with one or more of an IP address, a MAC address, a logical address, an International Mobile Subscriber ID (IMSI), a physical ID, and a hardware ID.

19. The method of claim 11, wherein one or more of a configuration of the second namespace or an isolation of the second namespace is based on one or more of a service chain ID (SCID), a SFID, or a SFEID.

20. The method of claim 11, further comprising:
communicating with a service proxy that is separate from the second WTRU; and
transmitting, based on a path computation element communicating with the service proxy, the FID directly to the service proxy.

\* \* \* \* \*